April 9, 1946.   W. F. ELLISON   2,398,178
AIR MOTOR
Filed July 24, 1944

INVENTOR,
Warren F. Ellison
Henry Molz
ATTORNEY.

Patented Apr. 9, 1946

2,398,178

UNITED STATES PATENT OFFICE 2,398,178

AIR MOTOR

Warren F. Ellison, Glendale, Calif.

Application July 24, 1944, Serial No. 546,384

3 Claims. (Cl. 121—63)

The primary purpose of my invention is the provision of a fluid operatable and controlled mechanism for actuating the conventional ratchet gear attached to the cross-feed screw of a tubular cut-off machine or the like in lieu of the conventional manual operating means.

A further object is the provision of a fluid motor that may readily be adapted for attachment to existing machines and devices of the aforementioned class as well as prove applicable to many other uses to which fluid operated and controlled propelling mechanism may be advantageously employed.

A further object of the present invention is the provision of a fluid operatable motor of the type disclosed, free from complicated structure, and operatable with little or no effort, whereby manual control may be dispensed with on either existing or newly built machinery to which it is applicable for the adoption of automatic operation and intermittent power control.

I attain these objects by the supplementary fluid operated and controlled mechanism illustrated in the accompanying drawing in which.

Figure 1:
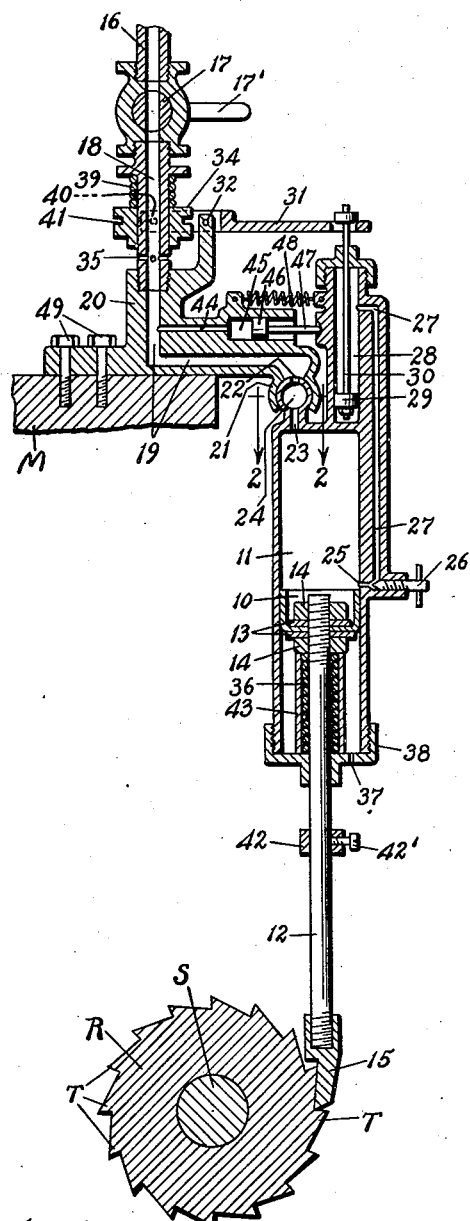
Figure 1 is a vertical section through my invention.
Figure 2:
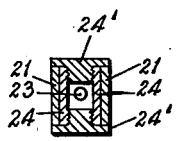
Figure 2 is a section on line 2—2 of Fig. 1.

Similar letters and numerals of reference indicate like parts throughout the several views. As viewed the drawing shows the invention as having just completed a power stroke and thereby starting the ratchet gear R in a clock-wise direction for the distance of one ratchet tooth T. The movement thus described was accomplished by the force of the operating fluid against a piston 10 mounted within a cylinder 11 upon the end of a push-rod 12 secured by washers 13 and nuts 14.

A pawl 15 is suitably secured to the other end of the push-rod 12 for engagement with the teeth T of the ratchet gear R which is fixed upon and rotates a cross-feed screw S of a cut-off machine or the like (not shown).

The fluid for operating the mechanism is admitted to the cylinder 11 from the pipe 16 through a manually operated valve 17 having a control handle 17'. Valve 17 is opened at the beginning of operations, and closed at its completion or otherwise as desired, by the machine operator.

The fluid flows from the valve 17 through an automatic valve 18 into and through a passageway 19 in a housing 20 provided with a depending cylinder like socket 21.

The fluid continues its flow from the passageway 19 through an inlet port 22 and an outlet port 23 of a tubular member 24 into the cylinder 11. This tubular member 24 protrudes from the cylinder 11 and is grasped by the socket 21, and thereby provides a means for swivelly suspending the cylinder 11 to permit movement of the pawl 15 into and out of engagement with the teeth T.

Suitable flanged plugs 24' simultaneously close the end of the member 24 and prevent it from moving out of the grasp of the socket 21.

The valve 18 is normally closed while the piston 10 is being driven. It is, however, shown in the exhaust position in the drawing because the piston 10 has reached the end of its power stroke and the fluid has flowed through a port 25, past a needle valve 26 through a passage-way 27 and into a cylinder 28 which may be formed integral with the body of the cylinder 11 as shown or may be separately provided.

The fluid entering the cylinder 28 causes a piston 29 therein to move away from the passage-way 27 to pull on a connection rod 30 engaging a lever 31 pivotly mounted at 32 for moving a sleeve 34 of the valve 18 away from valve ports 35 thereby permitting the air for example, to exhaust from the cylinder 11.

The exhaust from the cylinder 11 is through the port 23; tubular member 24, port 22, passageway 19 and the ports 35 of the valve 18, thereby relieving the pressure against the piston whereupon a spring 36 within the cylinder 11 thrusts against and returns the piston 10 toward the other end of the cylinder 11 in readiness for another power stroke.

The exhaust stroke of the piston 10 uncovers the port 25 to the rear of the piston 10 so that the pressure is relieved from the piston 29 and the fluid is exhausted from the cylinder 28 through the passage-way 27 past the needle valve 26 through the port 25, the rear end of the cylinder and an orifice 37 provided in a cap 38 which is provided to close the rear end of the cylinder 11.

The fluid is exhausted from the cylinder 28 by the action of a spring 39 (provided on the valve 18) against the sleeve 34, thereby moving the lever 31 against the connecting rod 30 of the piston 29 and at the same time closing the ports 35 preparatory to a new power stroke of the piston 10.

The lever 31 engages the sleeve 34 by means of a pin 40 and an annular groove 41.

An annular member 42 adjustably held on the rod 12 by a set screw 42', provides a limit stop for the upward movement of the rod 12 by engaging the cap 38 and the downward movement of the rod 12 is limited by a sleeve 43 placed about the spring 36 within the cylinder 11 between the cap 38 and the lower one of the nuts 14.

A fluid passage-way 44 in the housing 20 from the passage-way 19 to a cylinder 45 provides a way for pressure behind a piston 46 and a piston rod 47 engaging the cylinder 28 to normally rock the mechanism upon the swiveling tubular member 24 so as to hold the pawl 15 against the ratchet gear R.

When the action of the mechanism is stopped by manually closing the valve 17 and the pressure is relieved in the cylinder 45 through ports 35 to the atmosphere, a spring 48 pulls the cylinder 28 toward the housing 20, thereby causing the pawl 15 to move away from and clear the gear R so that it may be moved in reverse or counterclock-wise in order to reset a new piece of work within the cut-off machine, for example.

The invention proper may be attached to a machine M as by bolts 49.

The speed of the mechanism is controlled by setting the needle valve 26, slow to high speed, or the reverse, as may be necessary or desirable.

The structure and form of its components shown is for illustrative purposes only, for it is well known that other structures and positions of the respective components may be necessary to apply my invention to other machines wherein it is desired to achieve automatic intermittent power without, however, departing from the nature and scope of the invention as I have herein disclosed.

Moreover, while I have designated my invention as an air motor, it should be understood that it may readily be adapted for any fluid substance other than air as the operating driving power, thus, I specifically do not limit my said invention to the use of air as an operating medium, or claim so.

Readily produced from materials obtainable in the open market, and at no great cost, the invention furnishes a highly desirable adjunct to any machine to which it may be adaptable.

As many apparently different embodiments and changes in construction of this invention could readily be made without departing from the scope thereof as herein shown and described, it is intended that the description and drawing shall be interpreted as illustrative and not in a limiting sense.

What I do claim, however, as new and novel and desire to secure by Letters Patent is:

1. In a fluid motor, a cylinder, a piston reciprocable therein, a piston rod, a drive means including separable members one of which is carried by said piston rod and the other of which is adapted to be mounted on the member to be driven by the motor, means supporting said cylinder for movement to bring said drive members into and out of driving relation to one another, means for introducing operating fluid into said cylinder for moving the piston in a direction for driving said drive means, including a fluid passage and a manually operable valve for opening and closing said passage, spring means for moving said piston in the opposite direction, a spring normally holding said cylinder in a position separating said separable drive members, fluid responsive cylinder moving means operating when said manually operable valve is opened to move the cylinder against the action of said spring to a position bringing said drive members into driving relation, a fluid pressure relieving port in said passage, an automatic spring loaded valve for controlling said port being normally in a closed position, fluid responsive means operating when said piston reaches a predetermined position near the end of its power stroke for opening said automatic valve to relieve the operating pressure against said piston and said fluid responsive cylinder, moving means, whereby said spring will return said cylinder to position separating the driving members and said spring means will return said piston to position for starting its power stroke, and fluid pressure relieving means for relieving the pressure on said last named fluid responsive means when the piston is moved out of said predetermined position, whereby said automatic valve will be closed and the fluid again introduced in said cylinder and the operation of said piston will be repeated as long as the manually operable valve is open.

2. The invention as set forth in claim 1, together with a means for controlling the flow of fluid to and from the last named fluid responsive means and the rate of operation of said automatic valve for regulating the speed of operation of said piston.

3. The invention as set forth in claim 1, wherein the last-named pressure responsive means includes a cylinder mounted on said movable cylinder, a piston reciprocable thereon, means of operative connection between said last-named piston and said automatic valve, and a port leading from said movable cylinder to said last-named cylinder and controlled by the piston in the movable cylinder.

WARREN F. ELLISON.